United States Patent Office 3,826,805
Patented July 30, 1974

3,826,805
FLAME RETARDANT POLYESTERS BASED ON CYCLOHEXENE DIMETHANOL
Lowell R. Comstock, South Charleston, and Percy L. Smith, Dunbar, W. Va., assignors to Union Carbide Corporation, New York, N.Y.
No Drawing. Filed June 6, 1972, Ser. No. 260,199
Int. Cl. C08f 21/02; C08g 17/10, 17/12
U.S. Cl. 260—869
16 Claims

ABSTRACT OF THE DISCLOSURE

This invention relates to brominated, unsaturated polyesters, based on cyclohexene dimethanol and an unsaturated polycarboxylic acid or anhydride thereof, which possess excellent flame-retardant properties, relatively high heat distortion temperatures and are resistant to discoloration at temperatures normally encountered in molding cycles. The polyesters of this invention can be molded into aesthetically attractive, thermoset articles characterized by excellent dimensional stability.

---

This invention relates to flame-retardant, unsaturated polyesters, a process for the preparation thereof and to thermosetting compositions based thereof. More particularly, this invention relates to brominated polyesters based on cyclohexene dimethanol and an unsaturated polycarboxylic acid or anhydride thereof, which possess excellent flame-retardant properties, relatively high heat distortion temperatures and are resistant to discoloration at temperatures normally encountered in molding cycles. The polyesters of this invention can be molded into aesthetically attractive, thermoset articles, characterized by excellent dimensional stability, which are useful as structural elements such as fenders, dashboards and other like component parts of automobiles.

The production of flame-retardant, unsaturated polyesters has been carried out by condensing a mixture containing a diol and an unsaturated polycarboxylic acid to a polyester having an acid number of less than about 100 and thereafter brominating the preformed polyester with bromine. The post-brominated, unsaturated polyesters are thereafter admixed with a suitable vinyl monomer, such as styrene and as a rule with an accelerator such as a peroxide and the resultant mixture molded to form flame-resistant thermoset articles of desired configuration.

The area of use of such post-brominated polyesters has been limited, however, due to the relatively low heat distortion temperatures thereof and also, due to the tendency of such polyesters to discolor during the molding cycle. Consequently, thermoset articles produced therefrom are characterized by poor dimensional stability and by poor color characteristics.

The present invention provides flame-retardant polyesters which have relatively high heat distortion temperatures and are highly resistant to discoloration at temperatures normally encountered in molding cycles. As a result, the polyesters of this invention can be molded into thermoset articles characterized by excellent dimensional stability and by excellent color characteristics.

The polyesters of this invention are prepared by condensing a mixture, containing cyclohexene dimethanol and an unsaturated polycarboxylic acid or anhydride thereof or mixtures of one or more unsaturated polycarboxylic acid and/or anhydride, to a polyester having an acid number less than about 100, generally about 10 to about 60 and preferably about 25 to about 50. The unsaturated polyesters are then brominated to contain at least about 2 percent by weight combined bromine, generally about 2 to about 40 percent by weight combined bromine and preferably about 10 to about 25 percent by weight combined bromine based on the weight of the polyester.

Cyclohexene dimethanol as used herein encompasses all isomers thereof including 3-cyclohexene-1,1-dimethanol, 3-cyclohexene-2,2-dimethanol, 3 - cyclohexene-2,3-dimethanol, 3-cyclohexene-2,4-dimethanol, 3-cyclohexene-3,3-dimethanol and 3-cyclohexene-3,4-dimethanol as well as mixtures thereof.

Illustrative of suitable unsaturated polycarboxylic acids which can be used to produce the polyesters of this invention are unsaturated dicarboxylic acids having the formula:

Formula I

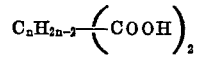

$$C_nH_{2n-3}{-}{\left(COOH\right)}_2$$

wherein $n$ is an integer having a value of 2 to 20 inclusive, preferably 2 to 10 inclusive. Among such acids can be noted fumaric acid, maleic acid, glutaconic acid, citraconic acid, itaconic acid, ethidene malonic acid, mesaconic acid, allylmalonic acid, propylidenemalonic acid, hydromuconic acid, pyrocinchonic acid, allyl succinic acid, carbocaprolactonic acid, teraconic acid, xeronic acids, cetylamalonic acid and other like ethylenically unsaturated acids.

Other suitable unsaturated acids include 4-amyl-2,5-heptadienedioic acid, 3-hexynedioic acid, tetrahydrophthalic acid, 3-carboxy cinnamic acid and the like.

If desired, the acid anhydrides of the acids previously described in the two preceding paragraphs can be used per se or in admixture with the acids.

Also, if desired, aromatic polycarboxylic acids, saturated polycarboxylic acids, anhydrides thereof or monocarboxylic acids can be used, in conjunction with the unsaturated polycarboxylic acids and/or the anhydrides thereof to produce the polyesters of this invention.

Illustrative of saturated polycarboxylic or aromatic polycarboxylic acids include, among others, phthalic acid, hexahydrophthalic acid, tetrachlorophthalic acid, succinic acid, adipic acid, suberic acid, azelaic acid, sebacic acid, and the like.

Also, saturated diols can be used if so desired in producing the polyesters of this invention. Among suitable diols are those having the formula:

Formula II

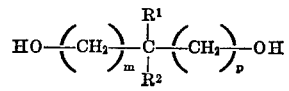

$$HO{-}{\left(CH_2\right)}_m{-}\underset{R^2}{\overset{R^1}{C}}{-}{\left(CH_2\right)}_p{-}OH$$

wherein the sum of $m+p$ is at least 1, generally 1 to 20 inclusive, preferably 4 to 10 inclusive and $R^1$ and $R^2$, which can be the same or different, are hydrogen or alkyl and when alkyl, containing 1 to 20 carbon atoms inclusive, preferably 1 to 10 carbon atoms inclusive. Specific compounds include, among others, ethylene glycol, propylene glycol, butanediol-1,2, butanediol-1,3, butanediol-1,4, hexanediol-1,6, decanediol-1,10, neopentyl glycol and the like.

Also suitable are the saturated ether diols having the formula:

Formula III

$$HO{-}(C_aH_{2a}O)_zH$$

wherein $a$ has a value of at least 1, preferably 2 to 6 inclusive, and $z$ has a value of at least 2, preferably 2 to 10 inclusive. Among compounds falling within the scope of this formula are diethylene glycol, dipropylene glycol, triethylene glycol, tetraethylene glycol, and the like.

In addition, the polyalkylene glycols such as polyethylene glycol and polypropylene glycol, having molecular weights ranging from about 1,100 to about 20,000, are also suitable.

In conducting the condensation reaction the total amount of "diol" used is at least about a stoichiometric amount, generally at least about 2 percent in excess of the stoichiometric amount and preferably about 2 to about 10 percent in excess of the stoichiometric amount, with the amount of cyclohexene dimethanol sufficient to provide a polyester, when brominated, with the bromine content previously described.

For purposes of stoichiometric calculations, amounts of "diol" as described are based on the total amount of "acidic reactants" in the reaction mixture. The "acidic reactants" include the unsaturated polycarboxylic acids, anhydrides thereof as well as other acids and anhydrides thereof which can be used if desired, in producing the polyesters of this invention.

The condensation reaction between the cyclohexene dimethanol and the "acidic" coreactant to produce the unsaturated polyesters is carried out at elevated temperatures on the order of about 165° C. to about 225° C. and preferably about 170° C. to about 200° C. for a period of time sufficient to produce an unsaturated polyester, having an acid number as previously described.

Bromination is effected by reacting a mixture containing the unsaturated polyester and bromine in an amount sufficient to obtain a polyester having the bromine content described previously. The bromination reaction is conducted at temperatures on the order of about 90° C. to about 125° C. and is exemplified in the example of this application.

As stated, the unsaturated polyesters of this invention can be formulated into molding compositions and formed into thermoset products useful in the automotive industry, boat industry and the like.

In formulating such compositions which are to be used in molding applications, it is customary to admix, with the unsaturated polyesters, the following materials:

(1) A polymerizable ethylenically unsaturated monomer which serves to cross-link the unsaturated polyester to a thermoset product.

(2) A peroxide which serves to accelerate the cross-linking reaction.

(3) Fillers, including fillers which serve as reinforcing agents.

Illustrative of suitable polymerizable, ethylenically unsaturated monomers are the vinyl monomers having the formula:

FORMULA IV

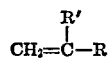

where R' is hydrogen, halogen or alkyl, i.e. methyl, R is a group having an unsaturated carbon-to-carbon, carbon-to-oxygen, or carbon-to-nitrogen group in conjunction with the vinyl group. Groups having such unsaturation in conjunction with the vinyl groups are aryl, ketonic, heterocyclic, nitrile, carbalkoxy, carboxy and amido.

Specific vinyl monomers include the following:

Wherein R is aryl; styrene; halogenated styrenes such as chlorostyrene, α-chlorostyrene, p-iodostyrene, m-fluorostyrene, dichlorostyrene; α-methylstyrene and the like; alkyl substituted styrenes such as p-methylstyrene, p-ethylstyrene, o-tert-butylstyrene and the like; alkoxy and aryloxy substituted styrenes such as p-ethoxystyrene, p-propoxystyrene,, p-phenoxystyrene and the like;

Wherein R is ketonic; ethyl vinyl ketone, n-propyl vinyl ketone, phenyl vinyl ketone and the like;

Wherein R is heterocyclic; vinyl pyridine, vinyl quinoline, vinyl pyrrole, vinyl carbazole, vinyl thiophene and the like.

Wherein R is nitrile; arcrylonitrile and the like;

Wherein R is amido; acrylamide, bicycloheptylacrylamide, diacetoneacrylamide and the like;

Wherein R is carboxy; acrylic acid and the like;

Wherein R is carbalkoxy; methyl acrylate, methyl methacrylate, butyl acrylate, octyl acrylate, lauryl acrylate, cyclohexyl acrylate, phenyl acrylate, benzyl acrylate and the like.

Also suitable is diallylphthalate and the like.

The amount of ethylenically unsaturated monomer used can vary over wide limits. For example, the monomer can be used in amounts of about 10 to about 60 percent by weight based on the combined weight of the monomer and the polyester. It is preferred to use about 20 to about 50 percent by weight ethylenically unsaturated monomer, based on the combined weight of the monomer and polyester.

Among suitable peroxides that can be used are those which function as free-radical polymerization initiators. Examples of such peroxides are the hydroperoxides such as tert-butyl hydroperoxide, cumene hydroperoxide, para-methane hydroperoxide and the like; peroxy esters such as di-tert-butyl diperoxyphthalate, tert-butyl peroxyacetate and the like; alkyl peroxides such as di-tert-butyl peroxide, dibenzyl peroxide and the like; ketone peroxides such as methyl ethyl ketone peroxide, cyclohexanone peroxide and the like; acyl peroxides such as benzoyl peroxide, para-chlorobenzoyl peroxide, 2,4-dichlorobenzoyl peroxide, lauroyl peroxide and the like.

The amount of peroxide used is sufficient to effect a cross-linking or thermosetting of the composition in a relatively short period of time. As a rule the amount used is about 0.1 to about 5 percent and preferably about 0.5 to about 2 to about 80 percent by weight based on the weight polyester.

Fillers which are commonly employed in polyester compositions include, among others, glass fibers, clay, calcium carbonate, silica, hydrated alumina, antimony oxide, and the like. These materials are generally used in amounts of about 2 to about 80 percent by weight based on the weight of the polyester resin.

In addition, if desired, phosphorus containing compounds such as tri(2-chloroethyl)phosphate can be added to the compositions of this invention.

The compositions of this invention can be prepared by mixing the components in a suitable apparatus such as a Cowles dissolver, at temperatures on the order of about 25° C. to about 50° C.

Once formulated, the compositions can be formed into thermoset articles of desired shape, particularly thermoset articles such as automobile fenders, dashboards, building panels, boats and the like. The actual forming cycle used such as hand lay-up, spray-up and molding using matched metal molds, will vary and depend upon the composition being used and the ultimate article formed.

Suitable molding cycles are conducted at temperatures on the order of 25° F. to about 250° F. for periods of time ranging from about 0.5 minute to about 5 minutes.

The following example further illustrates the present invention:

EXAMPLE 1

This example illustrates the preparation of a polyester based on 3-cyclohexene-1,1-dimethanol.

Into a reaction flask equipped with a mechanical stirrer, thermometer, condenser, dropping funnel and gas-inlet tube, there was charged 4 moles of maleic acid anhydride, 2 moles of 3-cyclohexene-1,1-dimethanol and 2.2 moles of ethylene glycol. The mixture was heated at a temperature of 200° C. to an acid number of 40. The resultant polyester was cooled to a temperature of about 100° C. and maintained at about 100° C. while bromine, in an amount of 1.2 moles, was added dropwise into the flask while the contents of the flask were constantly stirred and maintained under a nitrogen gas atmosphere. After the addition of the bromine, the contents of the flask were heated for one hour at a temperature of about 100° C. At the end of the one hour period, the bromine color disappeared therefrom indicating completion of the bromination reaction. To the "post" brominated polyester, which had an acid number of 36, there was added 0.01 percent by weight hydroquinone, based on the weight of the polyester. Styrene was then admixed with the polyester to obtain a styrene solution containing 30 percent by weight styrene.

Properties of the polyester and polyester-styrene composition are set forth in Table 1.

In order to demonstrate the excellent properties of the polyesters of this invention, properties of the polyester of Example 1 were compared to the properties of polyesters referred to as the Controls prepared by a process in which the polyester prepared was based on diols other than 3-cyclohexene-1,1-dimethanol.

Control 1 was prepared as follows and was based on 2-butene-1,4-diol.

Into a reaction flask equipped with a mechanical stirrer, thermometer, condenser, dropping funnel and gas-inlet tube, there was charged 2 moles of maleic acid anhydride, one mole of phthalic acid anhydride, 2.2 moles of ethylene glycol and 1 mole of 2-butene-1,4-diol. The mixture was heated at a temperature of 200° C. to an acid number of 40. The resultant polyester was cooled to a temperature of about 100° C. and maintained at about 100° C. while bromine, in an amount of 0.95 mole, was added dropwise into the flask while the contents of the flask were constantly stirred and maintained under a nitrogen gas atmosphere. After the addition of the bromine, the contents of the flask were heated for one hour at a temperature of about 100° C. At the end of the one hour period, the bromine color disappeared therefrom indicating completion of the bromination reaction. To the "post" brominated polyester, which had an acid number of 75, there was added 0.01 percent by weight hydroquinone, based on the weight of the polyester. Styrene was then admixed with the polyester to obtain a styrene solution containing 30 percent by weight styrene.

Control 2 was prepared as follows and was based on 5-bicycloheptene-2,2-dimethanol.

Into a reaction flask equipped with a mechanical stirrer, thermometer, condenser, dropping funnel and gas-inlet tube, there was charged 4 moles of maleic acid anhydride, 2 moles of 5-bicycloheptene-2,2-dimethanol and 2.4 moles of ethylene glycol. The mixture was heated at a temperature of 200° C. to an acid number of 36. The resultant polyester was cooled to a temperature of about 100° C. and maintained at about 100° C. while bromine, in an amount of 1.4 moles was added dropwise into the flask while the contents of the flask were constantly stirred and maintained under a nitrogen gas atmosphere. After the addition of the bromine, the contents of the flask were heated for one hour at a temperature of about 100° C. At the end of the one hour period, the bromine color disappeared therefrom indicating completion of the bromination reaction. To the "post" brominated polyester, which had an acid number of 55, there was then added 0.01 percent by weight hydroquinone, based on the weight of the polyester. Styrene was then admixed with the polyester to obtain a styrene solution containing 30 percent by weight styrene.

Control 3 was prepared as follows and was based on 2,2-dimethanol propyl-2,6-octadienyl ether.

Into a reaction flask equipped with a mechanical stirrer, thermometer, condenser, dropping funnel and gas-inlet tube, there was charged 1.08 moles of maleic acid anhydride, 0.54 mole of phthalic acid anhydride, 1.63 moles of ethylene glycol and 0.163 mole of the octadienyl ether. The mixture was heated at a temperature of 200° C. to an acid number of 24. The resultant polyester was cooled to a temperature of about 100° C. and maintained at about 100° C. while bromine, in an amount of 0.95 mole, was added dropwise into the flask while the contents of the flask were constantly stirred and maintained under a nitrogen gas atmosphere. After the addition of the bromine, the contents of the flask were heated for one hour at a temperature of about 100° C. At the end of the one hour period, the bromine color disappeared therefrom indicating completion of the bromination reaction. To the "post" brominated polyester, which had an acid number of 72, there was then added 0.01 percent by weight hydroquinone, based on the weight of the polyester. Styrene was then admixed with the polyester to obtain a styrene solution containing 30 percent by weight styrene.

TABLE 1

|  | Controls | | | |
| --- | --- | --- | --- | --- |
|  | 1 | 2 | 3 | Example 1 |
| Properties of polyester: | | | | |
| Percent by weight combined bromine | 22 | 22 | 13.5 | 20 |
| Acid number | 40 | 36 | 24 | 40 |
| Acid number after post bromination of polyester | 75 | 55 | 72 | 36 |
| Properties of styrene-polyester composition: | | | | |
| Percent by weight combined bromine | 16 | 16 | 9 | 14 |
| Acid number | 52 | 37 | 35 | 28 |
| Viscosity, centipoises | 1,000 | 2,880 | 2,500 | 254 |
| Gel time, min./sec. | 17/45 | 12/20 | 15/25 | 3/47 |
| Exotherm temp., ° C | | 114 | | 241 |
| Peak time, min./sec. | | 18/00 | | 5/40 |
| Color, Gardiner scale | 14 | 7 | 9 | 4 |
| Properties of cured styrene polyester composition: | | | | |
| Color, Gardiner scale | 14 | 10 | 12 | 4 |
| Heat distortion temp., ° C | <25 | 40 | <25 | 146 |
| Tensile strength, p.s.i. | 2,500 | 3,500 | 1,760 | 7,500 |
| Flexural strength, p.s.i. | | | 3,295 | 13,000 |
| Flammability ASTMD-635 | *SE | SE | SE | SE |

*SE = Self extinguishing.

Similar results are achieved using 3-cyclohexene-2,3-dimethanol, 3-cyclohexene-2,4-dimethanol, 3-cyclohexene-3,3-dimethanol and 3-cyclohexene-3,4-dimethanol in lieu of 3-cyclohexene-1,1-dimethanol.

Viscosity determinations noted in Table 1 were made at 25° C. using a Brookfield viscometer which was operated at 30 r.p.m. with a No. 3 spindle.

Compositions noted as being cured in Table 1 were cured or thermoset by adding thereto 1.0 percent by weight benzoyl peroxide, based on the total weight of the compositions, casting the compositions into plaques 5 inches by 12 inches by ¼ of an inch and subjecting the plaques to the following heating cycle:

2 hours at a temperature of 60° C.
3 hours at a temperature of 125° C.

Tensile strength and Flexural strength determinations noted in Table 1 were carried out according to the procedure described in ASTM test 638–64T.

Gel time determinations, including gel time, exotherm temperature and peak time, noted in Table 1 were carried out according to the standard tests of the Society Plastics Industry.

What is claimed is:
1. A flame retardant polyester which is the brominated condensation product of
   (A) cyclohexene dimethanol, and
   (B) at least one unsaturated dicarboxylic acid selected from the group consisting of fumaric acid, maleic acid, glutaconic acid, citraconic acid, mesaconic acid, itaconic acid, ethidene malonic acid, propylidene malonic acid, hydromuconic acid, pyrocinchonic acid, 3-carboxy cinnamic acid, teraconic acid, and the acid anhydrides thereof, or
   (C) a mixture of tetrahydrophthalic acid or its anhydrides with at least one of said unsaturated polycarboxylic acids or anhydrides,
said polyester containing at least about 2 percent by weight combined bromine and having an acid number less than about 100.

2. A flame-retardant polyester as defined in claim 1 wherein the combined bromine content is about 2 to about 40 percent by weight.

3. A flame-retardant polyester as defined in claim 1 wherein the acid number of the condensation product is about 10 to about 60.

4. A flame-retardant polyester as defined in claim 1 wherein the combined bromine content is about 2 to about 40 percent by weight and wherein the acid number of the condensation product is about 10 to about 60.

5. A flame-retardant polyester as defined in claim 1 wherein the mixture contains a glycol of the formula:

$$HO-(CH_2)_m-\underset{R^2}{\overset{R^1}{C}}-(CH_2)_p-OH$$

wherein the sum of $m+p$ is 1 to 20 inclusive and $R^1$ and $R^2$ are hydrogen or alkyl containing 1 to 20 carbon atoms inclusive.

6. A flame-retardant polyester as defined in claim 1 wherein the mixture contains a glycol of the formula:

$$HO(C_aH_{2a}O)_zH$$

wherein $a$ has a value of 2 to 6 inclusive and $z$ has a value of 2 to 10 inclusive.

7. A flame-retardant polyester as defined in claim 1 wherein the mixture contains maleic acid anhydride.

8. A flame-retardant polyester as defined in claim 3 wherein the glycol is ethylene glycol.

9. A flame-retardant polyester as defined in claim 1 wherein the mixture contains 3-cyclohexene-1,1-dimethanol.

10. A flame-retardant polyester as defined in claim 1 wherein the mixture contains 3-cyclohexene-1,1-dimethanol, ethylene glycol and maleic acid anhydride.

11. A thermosetting composition comprising the polyester defined in claim 1 and an ethylenically unsaturated monomer in an amount of about 10 to about 60 percent by weight.

12. A thermosetting composition as defined in claim 11 wherein the ethylenically unsaturated monomer is styrene.

13. A thermosetting composition as defined in claim 11 containing a peroxide.

14. The cured product of the composition defined in claim 11.

15. A method of producing a brominated polyester as defined in claim 1 which comprises brominating a condensation product of a mixture as defined in claim 1.

16. A polyester as defined in claim 1 wherein the mixture contains an aromatic acid.

References Cited

UNITED STATES PATENTS 3,536,782   10/1970   Toggweiler et al. ____ 260—869
3,697,625   10/1972   Smith et al. _____ 260—869

OTHER REFERENCES

Bjorksten: Polyesters, Reinhold, New York, 1956, pp. 21-24.

Lawrence: Polyester Resins, Reinhold, New York, 1960, pp. 20 and 22.

Boenig: Unsaturated Polyesters, Elsevier, New York, 1964, p. 100.

Kirk-Othmer, Encycl. Chem. Technol., vol. 20, Interscience, New York, 1969, pp. 791 and 802.

MELVIN GOLDSTEIN, Primary Examiner

U.S. Cl. X.R.

260—75 H, Dig. 24

UNITED STATES PATENT OFFICE
CERTIFICATE OF CORRECTION

Patent No. 3,826,805　　　　　　　　　Dated　July 13, 1974

Inventor(s) Lowell R. Comstock and Percy L. Smith

It is certified that error appears in the above-identified patent and that said Letters Patent are hereby corrected as shown below:

Column 1, the title should read --- FLAME RETARDANT POLYESTERS BASED ON CYCLOHEXENE DIMETHANOL AND THERMO-SETTING COMPOSITIONS OBTAINED THEREFROM ---. Column 1, line 25, "thereof" should read --- thereon ---. Column 4, line 29, after "2" delete the remainder of the sentence, and insert therefor --- percent by weight based on the weight of the polyester ---.

Signed and Sealed this seventh Day of October 1975

[SEAL]

Attest:

RUTH C. MASON
Attesting Officer

C. MARSHALL DANN
Commissioner of Patents and Trademarks